US006751746B1

(12) United States Patent
Jain et al.

(10) Patent No.: US 6,751,746 B1
(45) Date of Patent: Jun. 15, 2004

(54) METHOD AND APPARATUS FOR UNINTERRUPTED PACKET TRANSFER USING REPLICATION OVER DISJOINT PATHS

(75) Inventors: Bijendra N. Jain, Santa Clara, CA (US); Keith McCloghrie, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 550 days.

(21) Appl. No.: 09/629,585

(22) Filed: Jul. 31, 2000

(51) Int. Cl.[7] .................................................. H02H 3/05
(52) U.S. Cl. ............................................ 714/4; 370/218
(58) Field of Search ........................... 714/4, 3, 47, 712, 714/748; 370/235, 252, 217, 244, 394, 428, 218

(56) References Cited

U.S. PATENT DOCUMENTS

| | | | | | |
|---|---|---|---|---|---|
| 4,451,827 | A | * | 5/1984 | Kahn et al. | 340/825.52 |
| 5,485,465 | A | * | 1/1996 | Liu et al. | 714/4 |
| 5,530,808 | A | * | 6/1996 | Hammond et al. | 709/249 |
| 5,617,421 | A | * | 4/1997 | Chin et al. | 370/402 |
| 5,940,771 | A | * | 8/1999 | Gollnick et al. | 455/517 |
| 6,081,511 | A | * | 6/2000 | Carr et al. | 370/256 |
| 6,243,381 | B1 | * | 6/2001 | Cai et al. | 370/392 |
| 6,271,946 | B1 | * | 8/2001 | Chang et al. | 398/79 |
| 6,496,477 | B1 | * | 12/2002 | Perkins et al. | 370/228 |
| 6,542,469 | B1 | * | 4/2003 | Kelley et al. | 370/238 |

FOREIGN PATENT DOCUMENTS

WO     WO 00/13376    *   3/2000   ......... H04L/12/437

OTHER PUBLICATIONS

Orda et al. Routing with packet duplication and elimination in computer networks, IEEE transactions on communications, US, IEEE inc. New York, vol. 36, No. 7, Jul. 1, 1988, pp. 860–866.*
R. Callon, A. Vishwanathan, E. Rosen, "Multiprotocol Label Switching Architecture", Work in Progress, draft–ietf–mpls–arch–07.txt, Jul. 2000.
R. Callon, P. Doolan, N. Feldman, A. Fredette, G. Swallow, A. Viswanathan, "A Framework for Multiprotocol Label Switching", draft–ietf–mpls–framework–05.txt, Sep. 1999.
"Data Structures And Algorithms", by Alfred V. Aho, John E. Hopcroft, and Jeffrey D. Ullman, Addison–Wesley Publishing Co., 1983, Chapter 6, pp. 198–229.

* cited by examiner

Primary Examiner—Dieu-Minh Le
(74) Attorney, Agent, or Firm—Campbell Stephenson Ascolese LLP

(57) ABSTRACT

A method of operating a fault tolerant connection in a network is described. The network includes a number of network elements and a number of links. Each of the network elements is coupled to at least one other of the network elements by at least one of the links. The method identifies a first path and a second path. The first path is between a first one of the network elements and a second one of the network elements, as is the second path. Moreover, the first path and the second path are disjoint. This disjointedness can be any difference between the two paths (e.g., any combination of different network elements or links). A packet is sent from the first one of the network elements via the first path, while a duplicate packet is sent from the first one of the network elements via the second path. The duplicate packet is a duplicate of the packet. Once these packets have been sent, at least one of the packet and the duplicate packet are received at the second one of the network elements. If both the packet and the duplicate packet are received at the second one of the network elements, one of the two is discarded (e.g., by simply ignoring the last one received).

42 Claims, 6 Drawing Sheets

METHOD AND APPARATUS FOR UNINTERRUPTED PACKET TRANSFER USING REPLICATION OVER DISJOINT PATHS

BACKGROUND OF THE INVENTION

1. Field of the Invention

The present invention relates to computer networks, and, more particularly, to a method and apparatus for maintaining a datastream between network elements (e.g., routers) in a network.

2. Description of the Related Art

A wide variety of communications alternatives are currently available to telecommunications users. For example, e-mail and other forms of data communication can be used to relay messages and other information over existing data networks. Also, facsimile transmission of printed matter is available through what is commonly referred to as a stand-alone fax machine. Alternatively, fax-modem communication systems are currently available for personal computer users which combine the operation of a facsimile machine with the word processor of a computer to transmit documents held on computer disk. Modem communication over telephone lines in combination with a personal computer is also available to permit the transfer of files between computers. Simultaneous voice and modem data can also be transmitted over the lines using any one of several methods. Personal communications systems that combine a wide variety of communication functions into an integrated hardware-software product allow the user to conveniently choose from a number of communication modes. For example, personal communications systems exist which allow multiple users to efficiently communicate with one another using high quality voice over data communications links.

In fact, such teleconferencing capabilities have been extended to wide-area networks (WANs) such as the Internet. Voice-over-Internet-Protocol (VoIP), for example, is becoming a popular method of communication, supplanting traditional telephone services. Many other such methods of transferring media have come into use as the Internet has matured, including streaming audio, instant messaging and the like. However, for many such techniques, a failure within the network which such information passes can present unacceptable performance penalties. This is especially true for real-time or near-real-time applications (e.g., human conversations), in which dropouts and other outages can be most aggravating to users.

For example, consider a VoIP connection that uses real-time protocol (RTP) over a UDP/IP network infrastructure (e.g., the Internet), and the effects of a failure in one of the intermediate network links or network elements (e.g., a router or switch) between the connection's end-points. Clearly, VoIP packets will be dropped until such time as an alternate route through the network has been identified, and packets are re-routed along this new route.

Traditionally, users have relied on a routing protocol (e.g., open shortest path first or OSPF), to detect link/device failures and to re-compute a new path between the given pair of source and destination devices. Unfortunately, the time required for a breakdown to be discovered, and for the routing protocol (e.g., OSPF) to advertise the link-state and recompute the shortest path, is unacceptably high for most real-time applications, including VoIP. For example, in some VoIP systems, an interruption in transfer of packets for a duration 150 ms or more is considered unacceptably large. The delay in restoration is even larger if packets are label-switched. This is so because, in such a case, a new label-switched path must be set up before transfer of packets can resume.

What is therefore needed is a method and apparatus capable of handling failures in network infrastructure that affect a datastream traversing the network, while maintaining acceptable throughput in such situations. Such an approach is preferably capable of maintaining throughput, despite such failures, such that the interruptions are not noticeable to a user of the system.

SUMMARY OF THE INVENTION

The present invention, in various embodiments, addresses the aforementioned problems by providing a method and apparatus that address the problem of recovery from a breakdown of a path used to support datastreams traversing a network. Preferably, the technique employs a pair of node- or link-disjoint paths, which are identified and configured a-priori. If packet transfer is forced to occur along these paths (e.g., by the use of label-switching techniques), then failure within one of the two paths does not interrupt transfer of packets from the source to the destination. The present invention achieves uninterrupted transfer of packets by causing the source to replicate packets and send a copy along each path. Each intermediate node along each path then send the packet stream along the identified path. Finally, the destination node detects and discards duplicate packets based on sequence numbers contained within each packet. If a failure occurs in the path currently being used, no action need be taken, because the destination will continue to receive those packets being sent along the other path.

The techniques described herein provide several advantages. Chief among them is the ability to efficiently and effectively maintain a datastream (i.e., network connection) even though a failure may occur in the network path being used. Moreover, these techniques address the fundamental concern of maintaining such connections in a way that is transparent to the users of such a system. Simplicity and ease of implementation are also attractive features of these techniques. For example, no switching between the paths need be effected, because the destination simply uses whatever packets it receives and will continue to receive packets via the other path. Also discussed herein are computationally efficient techniques for computing a pair of shortest node-disjoint paths (and, similarly, link-disjoint paths).

In one embodiment of the present invention, a method of operating a fault tolerant connection in a network is described. The network includes a number of network elements and a number of links. Each of the network elements is coupled to at least one other of the network elements by at least one of the links. The method identifies a first path and a second path. The first path is between a first one of the network elements and a second one of the network elements, as is the second path. Moreover, the first path and the second path are disjoint. This disjointedness can be any difference between the two paths (e.g., any combination of different network elements or links). For example, the disjointness can be either (a) link-disjoint or (b) node disjoint. Two paths are link-disjoint if they do not have any link in common. Similarly, two paths are node disjoint if they do not have any node in common. A packet is sent from the first one of the network elements via the first path, while a duplicate packet is sent from the first one of the network elements via the second path. The duplicate packet is a duplicate of the packet. Once these packets have been sent, at least one of the packet and the duplicate packet are received at the second one of the network elements.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION OF THE INVENTION

Figure 1A:
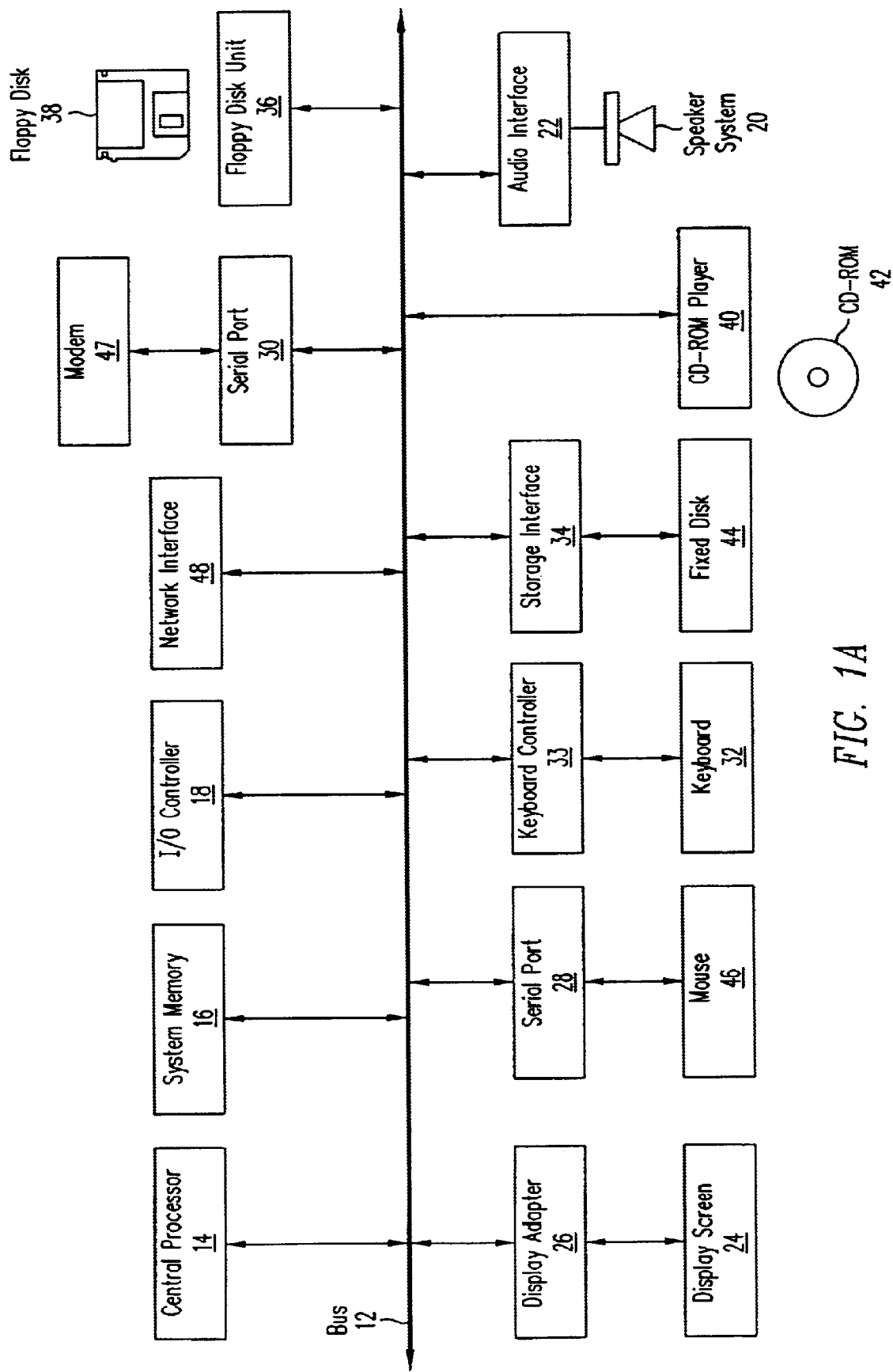
FIG. 1A is a block diagram illustrating a computer system suitable for implementing embodiments of the present invention.

The following is intended to provide a detailed description of an example of the invention and should not be taken to be limiting of the invention itself. Rather, any number of variations may fall within the scope of the invention which is defined in the claims following the description.
Introduction A method and apparatus according to embodiments of the present invention address the problem of recovery from a breakdown of a path used to support datastreams traversing a network. In particular, such an approach provides a reliable connection for real-time and near real-time applications, such as VoIP. Preferably, the technique employs a pair of shortest node-disjoint paths (or link-disjoint paths), which are identified and configured a-priori. If packet transfer is forced to occur along these paths (e.g., by the use of label-switching techniques), then failure within one of the two paths does not interrupt transfer of packets from the source to the destination. To achieve uninterrupted transfer of packets, the technique generally mandates the following features:

1. the source replicates packets and sends a copy along each path,
2. each intermediate node simply sends the packet stream along the identified path, and
3. the destination node detects and discards duplicate packets based on sequence numbers associated with each packet.

Thus, a method and apparatus according to the present invention avoids interruptions in the transfer of packets between the source and destination of a given connection. The technique devised by the inventors (referred to herein as "controlled replication") is based upon a-priori computation and availability of two (or more) alternate paths from the given source node to the destination node. The source node replicates each packet and sends a copy along each of the two (or more) alternate paths. The destination node detects and discards duplicate copies based on the sequence number associated with each packet. Such a technique typically requires that the source and destination initialize their sequence numbers.

The two (or more) paths differ from one another in that the paths are either link-disjoint or node-disjoint paths. If the paths are node-disjoint and the replicated packets follow the designated paths (i.e., as the paths are defined, in terms of nodes and links), at least one copy of every packet can be expected to reach the destination node even though an intermediate node or link along either of the node-disjoint paths may fail. Thus, the scheme is capable of tolerating failure of one or more nodes or links as long as they belong to the same path with the exception of the failure of a node common to two link-disjoint paths. In case the two paths are simply link-disjoint then one copy of every packet can be expected to reach the destination provided failed links belong to one of the two paths.

In order for the destination node to correctly identify duplicate copies of incoming packets, every packet should preferably be uniquely identified in some manner (although packets could be identified in other ways, such as comparing a received packet to stored copies (i.e., a finite packet history)). This can be accomplished, for example, by identifying every packet using a unique sequence number as part of the packet's header. This is easily addressed if, for example, the higher-layer protocol supports such functionality (e.g., real-time protocol (RTP)), as is the case for transfer of voice or video over UDP/IP. It should be noted, however, that the destination nodes cannot rely on the sequence numbers carried in the packets generated by certain protocol (e.g., TCP packets). In the case of the TCP protocol, this is so because the TCP protocol, by design, may send sequentially numbered duplicate packets to ensure error-free, loss-free, and in-sequence delivery of information. Such duplicate packets typically cannot be discarded by a lower-layer protocol without the potential for adversely affecting the higher-level protocol's ability to provide such functionality.

To ensure that every intermediate node forwards the incoming packets along the identified node- (or link-) disjoint path, a technique such as label-switching of packets along the paths may be employed. If label-switching is used to forward packets through the network, then the scheme configures a pair (or greater number) of label-switched paths along the node-disjoint (or link-disjoint) paths between the source and destination devices. Packets are replicated by the source node and forwarded along the two paths. The destination node detects and discards all duplicates. The sequence number associated with each packet is typically provided by a higher-layer protocol, such as RTP.

The techniques described herein provide several advantages. Chief among them is the ability to efficiently and effectively maintain datastreams (i.e., network connections) even though failures occurs in one of the network paths being used. Moreover, these techniques address the fundamental concern of maintaining such connections in a way that is transparent to the users of such a system. Simplicity and ease of implementation are also attractive features of these techniques. For example, no switching between the paths need be effected, because the destination simply uses whatever packets it receives and will continue to receive packets via the other path. Also discussed herein are computationally efficient techniques for computing a pair of shortest node-disjoint paths (and, similarly, shortest link-disjoint paths).

Exemplary Computer System and Network

FIG. 1A depicts a block diagram of a computer system 10 suitable for implementing the present invention, and exemplary of one or more of client terminals 112(1)–(N). Computer system 10 includes a bus 12 which interconnects major subsystems of computer system 10 such as a central processor 14, a system memory 16 (typically RAM, but which may also include ROM, flash RAM, or the like), an input/output controller 18, an external audio device such as a speaker system 20 via an audio output interface 22, an external device such as a display screen 24 via display adapter 26, serial ports 28 and 30, a keyboard 32 (interfaced with a keyboard controller 33), a storage interface 34, a floppy disk drive 36 operative to receive a floppy disk 38, and a CD-ROM drive 40 operative to receive a CD-ROM 42. Also included are a mouse 46 (or other point-and-click device, coupled to bus 12 via serial port 28), a modem 47 (coupled to bus 12 via serial port 30) and a network interface 48 (coupled directly to bus 12).

Bus 12 allows data communication between central processor 14 and system memory 16, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with computer system 10 are generally stored on and accessed via a computer readable medium, such as a hard disk drive (e.g., fixed disk 44), an optical drive (e.g., CD-ROM drive 40), floppy disk unit 36 or other storage medium. Additionally, applications may be in the form of electronic signals modulated in accordance with the application and data communication technology when accessed via network modem 47 or interface 48.

Storage interface 34, as with the other storage interfaces of computer system 10, may connect to a standard computer readable medium for storage and/or retrieval of information, such as a fixed disk drive 44. Fixed disk drive 44 may be a part of computer system 10 or may be separate and accessed through other interface systems. Many other devices can be connected such as a mouse 46 connected to bus 12 via serial port 28, a modem 47 connected to bus 12 via serial port 30 and a network interface 48 connected directly to bus 12. Modem 47 may provide a direct connection to a remote server via a telephone link or to the Internet via an internet service provider (ISP). Network interface 48 may provide a direct connection to a remote server via a direct network link to the Internet via a POP (point of presence).

Many other devices or subsystems (not shown) may be connected in a similar manner. Conversely, it is not necessary for all of the devices shown in FIG. 1A to be present to practice the present invention. The devices and subsystems may be interconnected in different ways from that shown in FIG. 1A. The operation of a computer system such as that shown in FIG. 1A is readily known in the art and is not discussed in detail in this application. Code to implement the present invention may be operably disposed or stored in computer-readable storage media such as one or more of system memory 16, fixed disk 44, CD-ROM 42, or floppy disk 38.

It will be noted that the variable identifier "N" is used in several instances in FIG. 1A to more simply designate the final element of a series of related or similar elements. The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 10). It is to be understood that such depicted architectures are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

An Exemplary Network

Figure 1B:
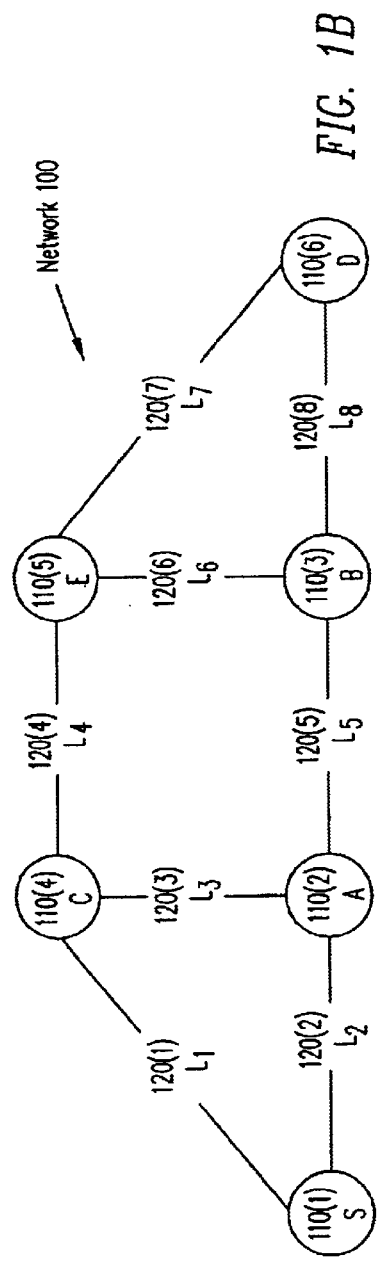
FIG. 1B is a block diagram depicting a network in which a technique according to the present invention may be practiced.

FIG. 1B is a block diagram depicting a network 100 that illustrates the components that make up network paths.

Computers such as computer system 10 can be employed as nodes (e.g., routers) in network 100. As is illustrated in FIG. 1B, network 100 includes a number of routers (n routers, exemplified in FIG. 1B by routers 110(1)–(6), where n=6) which are coupled to one another by a number of interconnecting links (m links, exemplified in FIG. 1B by links 120(1)–(8), where m=8). In order to facilitate the following discussions, routers 110(1)–(6) are also designated S, A, B, C, E and D, respectively. In similar fashion, links 120(1)–(8) are referred to using $L_1$–$L_8$, respectively. In a more general sense, network 100 can also be described as including n routers, $R_i$, i=1, 2, . . . , n, and m interconnecting links, $L_j$, j=1, 2, . . . , m. Network 100 is depicted in FIG. 1B as an undirected graph. Each router is modeled as a node and each link is represented by an undirected arc. For the present, it is assumed that no redundant links exist between any pair of routers. In other words, between any pair of nodes, x and y, there is at most one undirected arc. In fact, the method described below can be generalized to the case where there are parallel links between a pair of routers.

It is assumed that when a link between a pair of routers x and y fails, communication ceases in both directions. In graph theoretic terms, this is represented by the removal of the corresponding undirected arc between nodes, x and y. In other words, this implies that if communication from x to y ceases, then one cannot be sure of the link being up in the opposite direction. It is further assumed that associated with every link (x, y) there is a pair of non-negative weights, exemplified by and referred to herein as cost(x,y) and cost(y,x), that represent the cost of moving a packet from node x to node y, or from node y to node x, respectively. These weights are used to compute the shortest paths from a given source node, S, to a destination node, D. It will be noted that these weights are merely exemplary, and can represent a number of constituent factors (e.g., available bandwidth, current delays between the nodes, distance and other such metrics) and can be generated from these factors in any number of ways (e.g., numerical average, formulaic techniques or other such approaches).

Figure 2:
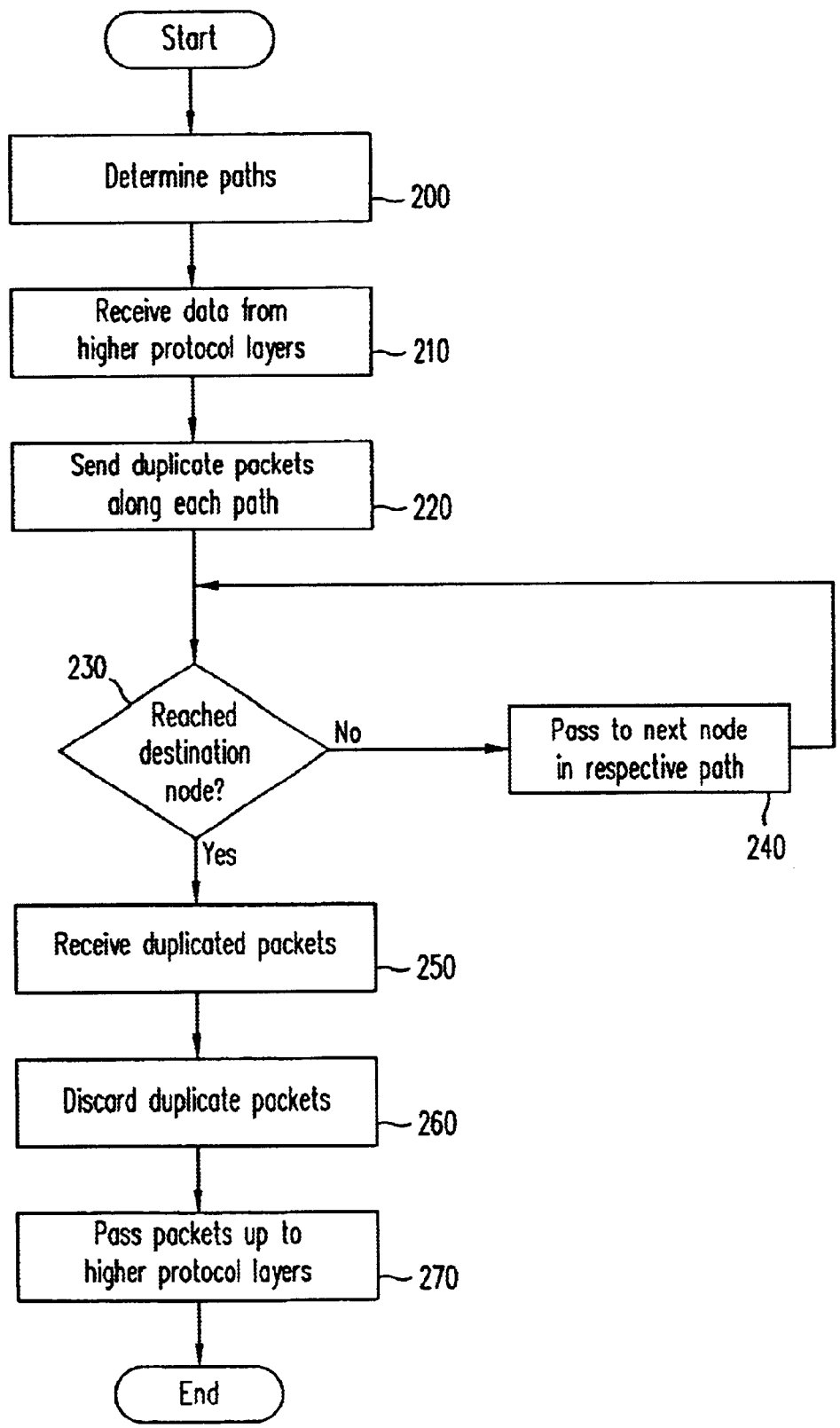
FIG. 2 is a flow diagram depicting a process according to the present invention.

FIG. 2 is a flow diagram depicting a process according to the present invention. The process begins with the determination of the paths that will be used to send packets from the source node (e.g., S of FIG. 1B) to the destination node (e.g., D of FIG. 1B) (step 200). The paths can be in any number of configurations. An important feature is that there be at least two paths employed, and that those two paths differ by at least either one node or one link. This difference allows connections (and the datastreams they represent) to tolerate one or more failures in the paths' dissimilar sections. Thus, for two paths differing by a single link (e.g., where the two paths are identical except for their use of different links between two of their nodes), the second path at least provides protection against a failure in the sections where the two paths differ. Preferably, the two or more paths are node-disjoint or link-disjoint, meaning that the paths either share no common nodes, or no common links, respectively. Greater fault tolerance (i.e., reliability) can be had by using more than two disjoint paths. This is discussed subsequently.

Once the paths have been determined, information to be sent across the network is received by the source (step 210). This information may be received from an application, for example. Once the information is received by the source node, the information is replicated in preparation for transmission along the paths determined previously. These duplicate packets are then sent out across their respective paths (step 220). As each intermediate node receives the packets (step 230), the intermediate node passes the packets on to the next intermediate node (or to the destination node, in the case of the last intermediate node in the path) (step 240). Once packets reach the destination node and are received (steps 230 and 250), the destination node discards duplicate packets (step 260). This can be accomplished by having the destination node pass all packets having unique identifiers up to the higher protocol layers, and ignore later-received duplicate packets (steps 250, 260 and 270). It will be noted that, in fact, the information received by the source node and the information passed on by the destination node may actually be received from, and passed on to, other nodes (and not from and to, respectively, higher protocol layers, as just discussed). Such scenarios are discussed subsequently in the context of duplication within and without local networks. Techniques for determining paths (e.g., node- and link-disjoint paths) are discussed in the next section.

Each of the blocks of the flow diagram of FIG. 2, and those depicted in subsequent figures, may be executed by a module (e.g., a software module) or a portion of a module or a computer system user. The methods described herein, the operations thereof and modules for performing such methods may therefore be executed on a computer system configured to execute the operations of the method and/or may be executed from computer-readable media. The method may be embodied in a machine-readable and/or computer-readable medium for configuring a computer system to execute the method. The software modules may be stored within and/or transmitted to a computer system memory to configure the computer system to perform the functions of the module. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Those skilled in the art will also recognize that the boundaries between modules and operations depicted herein are merely illustrative and alternative embodiments may merge such modules or operations, or impose an alternative decomposition of functionality thereon. For example, the actions discussed herein may be decomposed into sub-operations to be executed as multiple computer processes. Moreover, alternative embodiments may combine multiple instances of a particular operation or sub-operation. Furthermore, those skilled in the art will recognize that the operations described in exemplary embodiment are for illustration only. Operations may be combined or the functionality of the operations may be distributed in additional operations in accordance with the invention. As will also be apparent to those of skill in the art, methods for determining delay and jitter described herein may employ other techniques (similar in effect to those described herein) to make such determinations, and such alternative techniques are intended to be comprehended by the methods and apparati discussed herein.

Path Determination Techniques

A path from a source node S to destination D can be represented by $$\Pi = <S, x_1, x_2, \ldots, x_{k-1}, D>$$

where $x_i$, i=1, 2, . . . , k−1, are intermediate nodes. For this example, it is assumed that there is at most one link between a given pair of nodes, and so the sequence of links on the path are S–$x_1$, $x_1$–$x_2$, . . . , $x_{k-1}$–D, or equivalently, $\lambda_1$, $\lambda_2, \ldots, \lambda_{k-1}, \lambda_k$. As a consequence, the path may also be expressed in terms of links as:

$$\Pi=[\lambda_1, \lambda_2, \ldots, \lambda_{k-1}, \lambda_k]$$

The length of a path, $\Pi=[\lambda_1, \lambda_2, \ldots \lambda_{k-1}, \lambda_k]$ is given by $$\Sigma_{i=1 \ldots n} \text{cost}(x_i, y_i)$$

where link $\lambda_i=(x_i, y_i)$.

Node-disjoint Paths

The term node-disjoint paths can be defined as follows. Two paths from a source node S to a destination node D, $\Pi_1=<S, x_1, x_2, \ldots, x_{k1-1}, D>$, $\Pi_2=<S, y_1, y_2, \ldots y_{k2-1}, D>$, are said to be node-disjoint if and only if $x_i \neq y_j$, for all i,j. In FIG. 1B, for example, paths <S, A, B, D> and <S, C, E, D> are node-disjoint.

Link-disjoint Paths

The term link-disjoint paths can be defined as follows. Two paths, expressed in terms of links, from a source node S to a destination node D, $\Pi_1=[\lambda_1, \lambda_2, \ldots, \lambda_{k1}]$ and $\Pi_2=[\mu_1, \mu_2, \ldots, \mu_{k2}]$ are said to be link-disjoint if and only if $\lambda_i \neq \mu_j$, for all i,j. In FIG. 1B, for example, paths [S-A, A-B, B-D] and [S-C, C-E, E-D] are link-disjoint.

Figure 3:
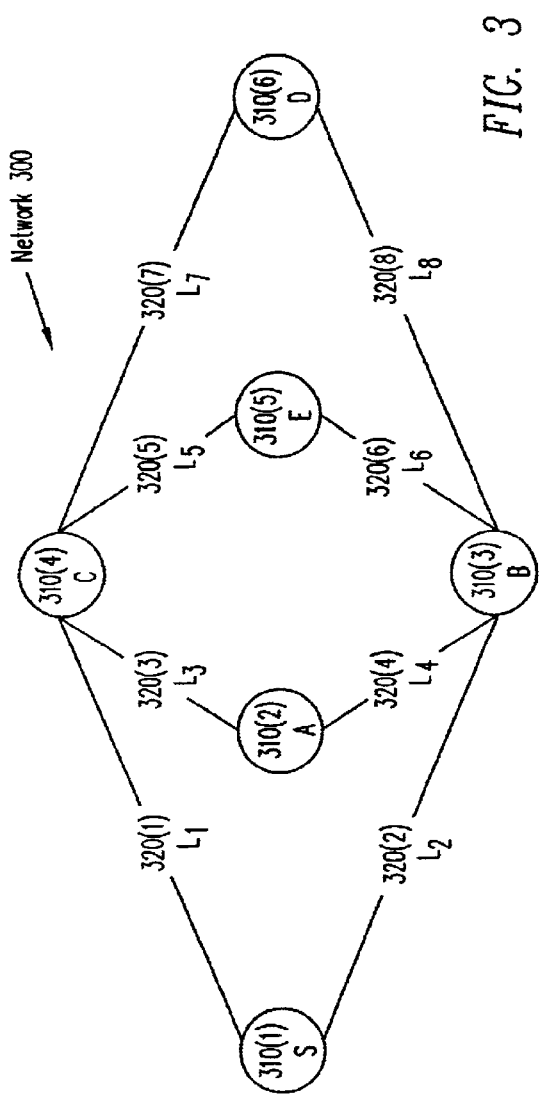
FIG. 3 is a block diagram depicting a network that further illustrates network paths according to embodiments of the present invention.

FIG. 3 is a block diagram depicting a network 300 that further illustrates the components that make up network paths. As is illustrated in FIG. 3, network 300 includes a number of routers (n routers, exemplified in FIG. 3 by routers 310(1)–(6), where n=6) which are coupled to one another by a number of interconnecting links (m links, exemplified in FIG. 3 by links 320(1)–(8), where m=8). In order to facilitate the discussions herein, routers 310(1)–(6) are also designated S, A, B, C, E and D, respectively. In similar fashion, links 320(1)–(8) are referred to using $L_1$–$L_8$, respectively. In a more general sense, network 300 can also be described as including n routers, $R_i$, i=1, 2, . . . , n, and m interconnecting links, $L_j$, j=1, 2, . . . , m. Network 300 is depicted in FIG. 3 as an undirected graph, and, as before, each router is modeled as a node and each link is represented by an undirected arc. For the present, it is assumed that no redundant links exist between any pair of routers. In other words, between any pair of nodes, x and y, there is at most one undirected arc, although this not need be the case for the methods and apparati described herein to function correctly.

When taken together, two link-disjoint paths, unlike node-disjoint paths, may form one or more loops. Loops, per se, do not generally present any problems, as long as packets sent along a path carry some form of path identifier (path-id) as part of their header that enables the correct traversal of such loops. For instance, paths [S-C, C-A, A-B, B-D] and [S-B, B-E, E-C, C-D] in FIG. 3 are link disjoint. But taken together, the two paths have a loop [. . . , C-A, A-B, B-E, E-C, . . . ]. As will be apparent to those of skill in the art, a pair of node-disjoint paths is always a pair of link-disjoint paths.

A method for identifying a pair of node-disjoint (or link-disjoint) paths that have the additional property that their path length is "shortest" is described. In such a scenario, it is assumed that the underlying routing is OSPF-based, although this need not be the case. In other words, the assumption is that if packets are IP-switched based on destination IP address, then the paths are computed using an OSPF algorithm. Similarly, if packets are label-switched, then the paths are computed (and set-up) using OSPF. First, the terms "pair of shortest node-disjoint paths" and "pair of shortest link-disjoint paths" are defined. Again, it will be noted that such methods can easily be extended to the case where more than two paths are to be employed in providing the functionality described herein, and the fact that the description of the methods and apparati in terms of a pair of paths is merely exemplary.

Shortest Node-disjoint Paths

The shortest node-disjoint paths can be defined as follows. The two paths $\Pi_1=<S, x_1, x_2, \ldots, x_{k1-1}, D>$, and $\Pi_2=<y_1, y_2, \ldots, y_{k2-1}, D>$, are referred to herein as a "pair of shortest node-disjoint paths" if and only if:

1. paths $\Pi_1$ and $\Pi_2$ are node-disjoint,
2. path $\Pi_1=<S, x_1, x_2, \ldots x_{k1-1}, D>$ is the shortest path from source node S to destination node D, and
3. path $\Pi_2$ is the shortest path from source S to destination D which does not go through nodes, $x_1, x_2, \ldots, x_{k1-1}$.

It will be noted that the path $\Pi_2$ is, by design, the shortest amongst all paths that are node-disjoint to $\Pi_1$. It is not necessarily the second-shortest path from source to destination as well, although such may be the case. It will also be noted that in some cases, given a shortest path $\Pi_1$ from source S to destination D, there may not exist a path which is node-disjoint to $\Pi_1$, even though there may exist two node-disjoint paths from S to D. For instance, in FIG. 1B, if the shortest path $\Pi_1=<S, C, A, B, D>$, there is no path from S to D which is node-disjoint to $\Pi_1$. This is in spite of the fact that there are two node-disjoint paths <S, A, B, D> and <S, C, E, D> from S to D.

It will be noted that two node-disjoint paths are capable of tolerating one or more node failures as long as the failed nodes are on the same path. Alternatively, it can be shown that there exists a pair of nodes such that, if that pair of nodes were to fail, then communication between the source and destination fails. The fault-tolerance may also be specified in terms of the probability that at least one copy of a packet reaches the destination. The success probability is 1-(1-P1)(1-P2), where P1 and P2 are the corresponding probability that path, $\Pi$1 or $\Pi$2 is "up" (i.e., operational).

It will also be noted that the use of paths having different path lengths, delay characteristics, node processing capabilities and the like may result in the packets traversing those paths experiencing varying amounts of delay. For example, the fact that a source is sending packets along two paths, one of which is shorter, can be expected to result in reduced delay along the shorter path. Assuming that at least one path is "up" (i.e., operational), the delay may be computed as $[P_1(1-P2)\delta_1+(1-P1)P_2\delta_2+P_1P_2\delta_1]/[1-(1-P1)(1-P2)]$, where $\delta_1$ and $\delta_2$ are delay over $\Pi_1$ and $\Pi_2$, respectively, and $\delta_1<\delta_2$.

Shortest Link-disjoint Paths

The shortest link-disjoint paths can be defined as follows. The two paths $\Pi_1=[\lambda_1, \lambda_2, \ldots, \lambda_{k1}]$ and $\Pi_2=[\mu_1, \mu_2, \ldots, \mu_{k2}]$ are said to be a "pair of shortest link-disjoint paths" if and only if:

1. paths $\Pi_1$ and $\Pi_2$ are link-disjoint,
2. path $\Pi_1=[\lambda_1, \lambda_2, \ldots, \lambda_{k1}]$ is the shortest path from source node S to destination node D, and
3. path $\Pi_2$ is the shortest path from source S to destination D which does not include links, $[\lambda_1, \lambda_2, \ldots, \lambda_{k1}]$.

Note that the (second) path $\Pi_2$ is, by design, the shortest amongst all paths that are link-disjoint to $\Pi_1$. It is not necessarily the second-shortest path from source to destination, although such may be the case. It will be noted that in some cases, given a shortest path $\Pi_1$ from source S to destination D, there may not exist a path which is link-disjoint to $\Pi_1$, even though there may exist two link-disjoint paths from S to D. For instance, in FIG. 1B, if the shortest path $\Pi_1=[S-C, C-A, A-B, B-D]$, there is no path from S to D which is link-disjoint to $\Pi_1$. It will be noted that the path [S-A, A-C, C-E, E-D] is not link-disjoint to $\Pi_1$ since links (C-A) or (A-C) are common to the two paths. It will be apparent to one of skill in the art that, even though a pair of node-disjoint paths are also link-disjoint, a "pair of shortest node-disjoint paths" is not always a "pair of shortest link-disjoint paths", since there may exist a shorter path, $\Pi_2$, which is also link disjoint to $\Pi_1$.

As has been noted, the methods described herein can easily be extended to the use of three or more disjoint paths. By identifying the requisite number of disjoint paths and sending multiple copies along those paths, such a method provides an even more robust solution to failures in the given network. However, at some point, it will not be possible to identify another disjoint path, due to the finite resources in any network (at least in a combinatorial sense). Even in such a case, however, further paths may be advantageously identified, so long as unused nodes (or links) remain. This is true because a new path that contains a previously-unused node or link provides a measurable increase in reliability as a result of the ability to avoid a failure in another node or link. Thus, for example, if the last path contains a previously-unused link, packets traversing that link will necessarily avoid traversing another link in the network, thus enhancing reliability.

It may be argued that every increase in the number of paths over which packets are sent consumes that much more bandwidth. While this may be of concern in some situations, in others, the extra bandwidth required may not be of consequence. For example, adding another path when transporting streaming video can consume a substantial amount of bandwidth (although this depends greatly on the networking technology employed). VoIP packets, however, are relatively low bandwidth, and the addition of another redundant path has little effect on the network's overall bandwidth that is available. This is particularly appropriate in situations where the information carried over such a connection is of a critical nature, and reliability is of paramount importance. Thus, for many applications, the use of several redundant paths is warranted and economical.

In fact, a method and apparatus according to the present invention can provide the benefits of fault tolerance, at least to some extent, so long as a minimum of two paths are used and the two paths differ by at least one link or node. Such a collection of paths is referred to herein as being disjoint, in a general sense. In other words, if only two paths are designated and the two paths differ by at least one link or node, they are disjoint, and can at least provide fault tolerance in the sections of the network in which the two paths differ. This concept of paths having simply any kind of disjointedness can provide special advantages in certain situations, examples of which are described in further detail below.

Figure 4A:
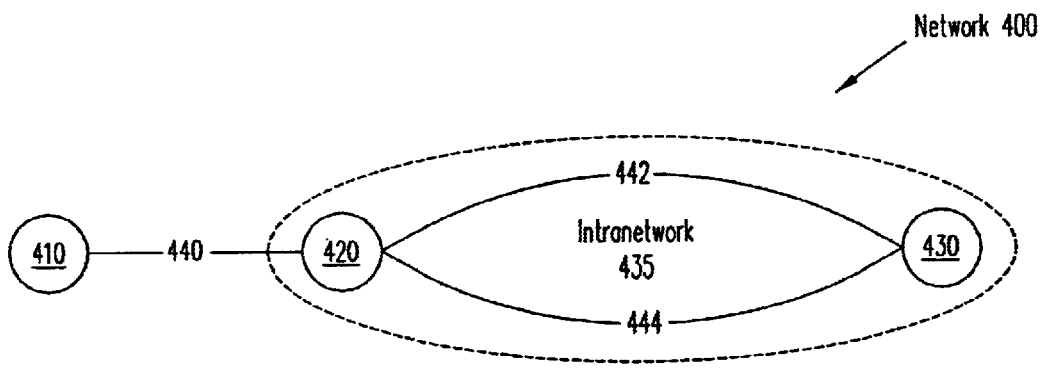
FIGS. 4A, 4B and 4C are block diagrams depicting various network configurations that illustrate situations in which the source node, the destination node or both receive (or send) information from (to) other nodes, rather than from (to) higher layers.
Figure 4B:
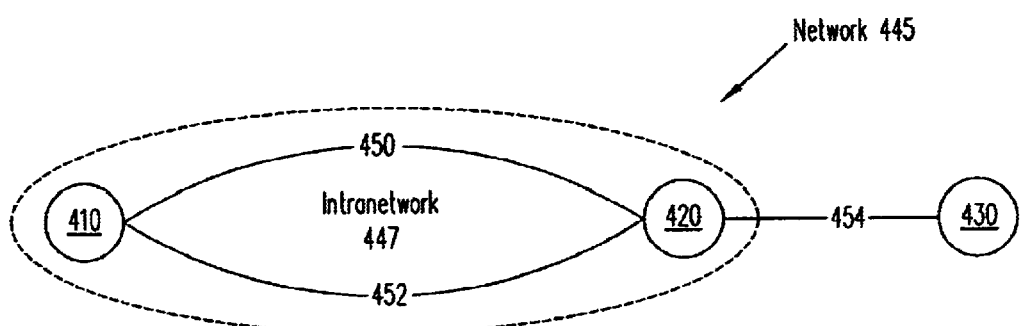
Figure 4C:
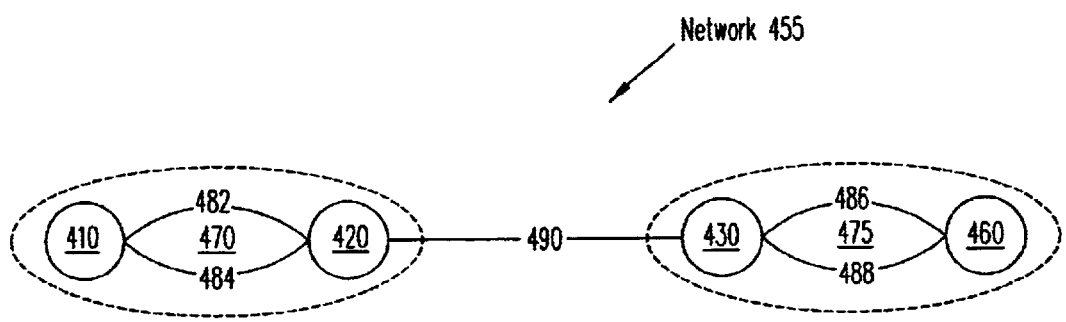

FIGS. 4A, 4B and 4C are block diagrams depicting various network configurations that illustrate situations in which the source node, the destination node or both receive (or send) information from (to) other nodes, rather than from (to) higher layers. FIG. 4A is a block diagram illustrating a network 400, which is depicted as including nodes 410, 420 and 430, with nodes 410 and 430 serving as the source and designation nodes, respectively. Nodes 420 and 430 are also depicted as being included in an intranetwork 435. It will be noted that intranetwork 435 is termed as such to represent that nodes 420 and 430 are within a single computing environment (e.g., a local area network), of which node 410 is not a part. Nodes 410, 420 and 430 are interconnected by paths 440, 442, and 444. It will be noted that, for simplicity, the networks depicted in FIGS. 4A, 4B, and 4C are shown in terms of nodes and paths, rather than nodes and links. The distinction between the paths shown in these figures and the links described elsewhere herein is that the paths of FIGS. 4A, 4B, and 4C include nodes and links, which are abstracted into the paths to simplify this discussion. In network 400, the configured paths are the same until the packets reach node 420, at which point they diverge into paths 442 and 444. Thus, while a failure in path 440 will be debilitating, a failure in path 442 (or 444) will not interrupt a connection over the remaining path. Alternatively, the function of splitting the datastream into duplicate datastreams can be performed at node 420, with the use of replication being transparent (that is, unknown) to node 410.

A configuration such as that depicted in FIG. 4A can be useful in the situation where communication over path 440 comes at a relatively high cost. In that case, the path between node 410 and node 420 is a single one, in order to reduce bandwidth requirements, and so costs. Within intranetwork 435, the cost of communication is relatively inexpensive (in terms of bandwidth cost, distance or some other metric or combination thereof), so that employing multiple paths is not undesirably expensive. Thus, a method and apparatus according to the present invention can flexibly accommodate variations in link cost, and so provide fault tolerance only in sections of the network where the tradeoff between cost and reliability favors reliability.

FIG. 4B is a block diagram illustrating a network 445, which is again depicted as including nodes 410, 420 and 430, with nodes 410 and 430 serving as the source and destination nodes, respectively, in a fashion similar to that depicted in FIG. 4A. Nodes 410 and 420 are also depicted as being included in an intranetwork 447. In FIG. 4B, nodes 410, 420 and 430 are interconnected by paths 450, 452 and 454. As before, paths 450, 452 and 454 are abstractions representing the nodes and links between the endpoints of the given path. In the manner of network 400, the configured paths in network 445 immediately diverge into paths 450 and 452, within intranetwork 447. Upon exiting node 420, paths 450 and 452 converge into path 454, proceeding to node 430, the destination node. Thus, while a failure in path 454 will be debilitating, a failure in path 450 (or 452) will not interrupt a connection over the remaining path. As before, this topology can be useful in the situation where communication over path 454 comes at a relatively high cost. Multiple paths are used in the sections of network 445 where such multiplicity can be had at reasonable cost, but are avoided in sections of network 445 where the costs of such fault tolerance are not economical. Alternatively, the function of discarding duplicate packets that make up the datastream can be performed at node 420, rather than at node 430. In that case, the packet replication performed to provide redundancy is transparent (that is, unknown) to node 430.

FIG. 4C is a block diagram illustrating a network 455, which is depicted as including nodes 410, 420, and 430, and, additionally, a node 460, with nodes 410 and 460 serving as the source and designation nodes, respectively. Nodes 410 and 420 are depicted as being included in an intranetwork 470, while nodes 430 and 460 are depicted as being included in an intranetwork 475. Nodes 410 and 420 are depicted as being coupled to one another by paths 482 and 484, while nodes 430 and 460 are depicted as being coupled to one another by paths 486 and 488. Nodes 420 and 430 are depicted as being coupled to one another by a path 490, which also serves to couple intranetworks 470 and 475. As before, paths 482, 484, 486, 488 and 490 are abstractions representing the nodes and links between the endpoints of the given path.

In network 455, packets in network 445 immediately diverge into paths 482 and 484, within intranetwork 470.

Upon exiting node 420, paths 482 and 484 converge into path 490, proceeding to node 430. Upon exiting node 430, the received packets again diverge, along paths 486 and 488. Finally, the packets arrive at node 430, where duplicates are discarded. In this case, the replication performed within intranetworks 470 or 475 can be completely transparent to the networking operations performed the other. Thus, while a failure in path 490 will be debilitating, a failure in one of paths 482 or 484 will not interrupt a connection over the remaining paths. Additionally, a failure in one of paths 486 or 488 will not interrupt the connection. As before, this topology can be useful in the situation where communication over path 490 comes at a relatively high cost in comparison to the costs within intranetworks 470 and 475, where the costs of such fault tolerance may be more economical.

Replication Over a Pair of Shortest Node-Disjoint Paths

A scheme for replication over shortest node-disjoint paths is described that implements a packet transfer scheme based on packet replication along a pair of shortest node-disjoint paths. For a given pair of source and destination nodes, S and D, let $$\Pi_1 = <S, x_1, x_2, \ldots, x_{k1-1}, D> = [\lambda_1, \lambda_2, \ldots, \lambda_{k1}]$$

and $$\Pi_2 = <S, y_1, y_2, \ldots, y_{k2-1}, D> = [\mu_1, \mu_2, \ldots, \mu_{k2}]$$

be a "pair of shortest node-disjoint paths" (the case of link-disjoint paths is considered subsequently). In fact, the two descriptions of a path $\Pi_1 = <x_0, x_1, \ldots, x_{k1}> = [\lambda_1, \lambda_2, \ldots, \lambda_{k1}]$ are equivalent provided link $\lambda_i = (x_{i-1}, x_i)$, and there exists at most one link between a given pair of nodes. The source sends a copy of each packet along each of the two paths. In doing so, the source router copies the packet onto the first link along each path. Intermediate nodes on the shortest path (and similarly, those on the second-shortest path) simply forward the packet along the identified paths. The destination detects and discards any duplicates, based on header information that can include, for example, source and destination addresses, flow identifier, sequence numbers and other such information.

Figure 5:
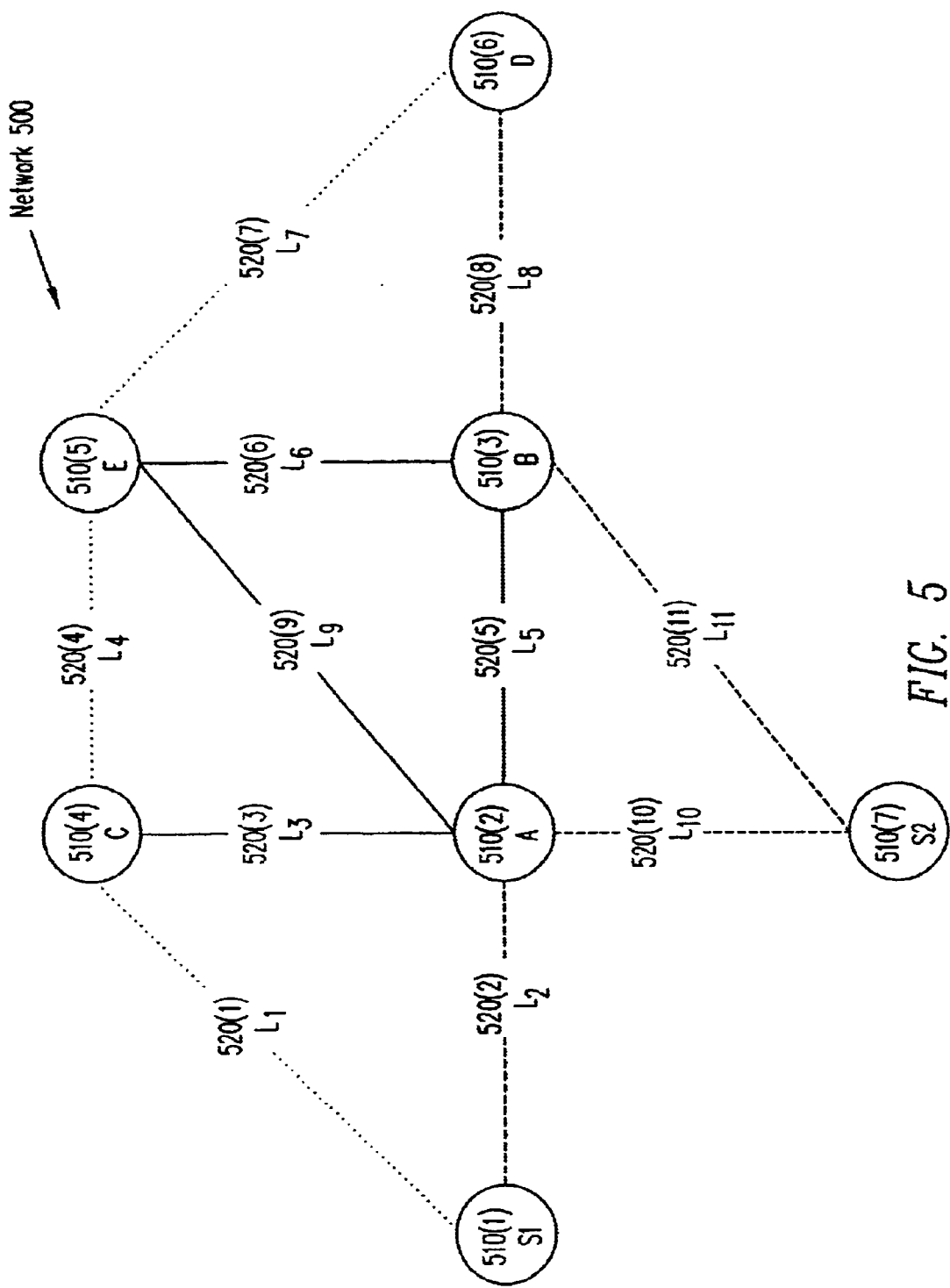
FIG. 5 is a block diagram depicting a network further illustrating node-disjoint paths according to embodiments of the present invention.

FIG. 5 is a block diagram depicting a network 500 that further illustrates the node-disjoint paths just discussed. As is illustrated in FIG. 5, network 500 includes a number of routers (n routers, exemplified in FIG. 5 by routers 510(1)–(7), where n=7) which are coupled to one another by a number of interconnecting links (m links, exemplified in FIG. 5 by links 520(1)–(11), where m=11). In order to facilitate the discussions herein, routers 510(1)–(7) are also designated S1, A, B, C, E, D and S2, respectively. In similar fashion, links 520(1)–(11) are referred to using $L_1$–$L_{11}$, respectively. As before, network 500 can also be described as including n routers, $R_i$, i=1, 2, . . . , n, and m interconnecting links, $L_j$, j=1, 2, . . . , m. Network 500 is depicted in FIG. 5 as an undirected graph, and, as before, each router is modeled as a node and each link is represented by an undirected arc. As an example of shortest node-disjoint paths, the network of FIG. 5 contains the source-destination nodes, S1 and D, respectively. For network 500, the pair of shortest node-disjoint paths from S1 to D can be defined as $\Pi_1 = <S1, A, B, D>$ and $\Pi_2 = <S1, C, E, D>$ Node S1 forwards a copy of each packet to both node A and node C. Node C then forwards the copy it received from S1 to E, which in turn forwards it to D. In a similar fashion, node A forwards the copy it received from S1 to B, which in turn forwards it to D. Node D discards the second copy of a packet it receives. Thus, whichever packet is received last by node D is discarded, regardless of the path taken.

The proper operation of the methods just described is predicated on the assumption that the packets traversing the network do so over the paths, with the intermediate nodes forwarding the received packets along the identified node-disjoint paths. That is, each intermediate node forwards incoming packets to the next node identified by that node's respective node-disjoint path. This may not be the case if an intermediate node relies on the entry that corresponds to the address of destination D in its routing table (e.g., an OSPF-generated routing table). However, if packets are not forwarded along the designated path, such a method may continue to be at risk of failing when a single node fails. For example, one may consider transfer of packets from source node S2 to destination node D (FIG. 5). In such a scenario, it will be assumed that the pair of shortest node-disjoint paths from node S2 to node D are $<S2, B, D>$ and $<S2, A, E, D>$. In particular, if node A relies on its OSPF-generated route to node D, then node A would forward all packets received from node S2, to node B, assuming that the shortest path from node A to node D is via node A. Instead, if the shortest path from node A to node D is via node E, then node A would forward all packets it receives from source node S1 to node E. This creates a problem with respect to forwarding of packets originating at source node S1 and destined to node D because all the packets, in the latter case, would traverse $<E-D>$. This exposes the connection between S2 and D to complete failure in the situation where a failure occurs in node E and/or the link $<E-D>$.

In such cases, this possibility must be taken into account so that intermediate nodes forward packets along the specified node-disjoint paths. One such alternative is based on generating, propagating and maintaining routing tables that are indexed on source/destination node pairs. Another alternative is based on configuring end-to-end paths and forcing the packets along these paths using, for example, label-switching. In such a method, the methods described previously are employed, with the additional capability of maintaining packet traffic along the designated path using, for example, multi-protocol label switching (MPLS). Such an approach does require that routing information for the paths between the given pair of source and destination nodes be propagated to intermediate routers. Additionally, such an approach also requires that the label-switched paths be configured prior to their being used. This results in a topology such as that described below.

Figure 6:
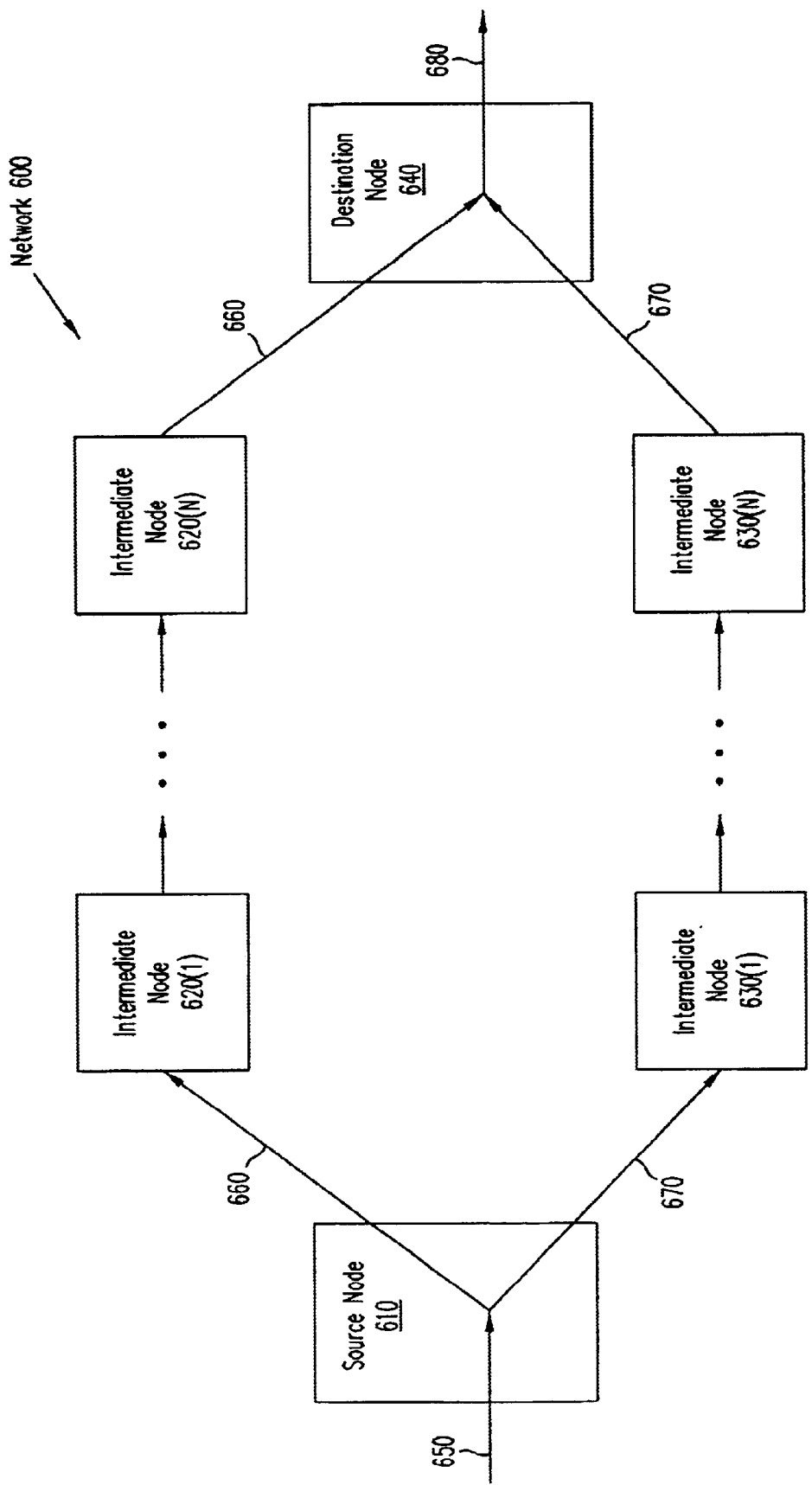
FIG. 6 is a block diagram depicting a network illustrating the label-switched node-disjoint paths according to embodiments of the present invention.

FIG. 6 is a block diagram depicting a network 600 that illustrates the label-switched node-disjoint paths just discussed. As is illustrated in FIG. 6, network 600 includes a source node 610, a number of routers in a first shortest node-disjoint path (exemplified in FIG. 6 by intermediate nodes 620(1)–(N)) which are coupled to one another by a number of interconnecting links, a number of routers in a second shortest node-disjoint path (exemplified in FIG. 6 by intermediate nodes 630(1)–(N)) which are also coupled to one another by a number of interconnecting links, and a destination node 640. A data stream 650 enters source node 610 and is replicated into datastreams 660 and 670. Datastream 660 traverses the first shortest node-disjoint path through intermediate nodes 620(1)–(N), while datastream 670 traverses the second shortest node-disjoint path through intermediate nodes 630(1)–(N). The packets making up both datastream 660 and datastream 670 then arrive at destination node 640, where duplicate packets are suppressed (e.g., based on the packets' sequence numbers). The determination of shortest node-disjoint paths (as well as shortest link-disjoint paths) is described subsequently.

It should be noted that shortest link-disjoint paths may be employed instead of shortest node-disjoint paths. As will be apparent to one of skill in the art, if packets sent by the source node cannot be guaranteed to traverse the network along the designated paths, one would still need to label-switch packets along the link-disjoint paths (or force them to traverse the designated paths in some other manner). The fault tolerance provided by a link-disjoint approach is, however, weaker. This is because a scheme employing link-disjoint label-switched paths can tolerate failure of up to one link in either path (but not both paths).

Procedures for Computing Shortest Node- or Link-Disjoint Paths

Procedures for computing the pair of shortest node- (or link-) disjoint paths from a given source node to all destination nodes in a given network are now described. The first procedure describes a process that computes a pair of shortest and second-shortest node-disjoint paths. The second procedure describes a process that computes a pair of shortest link-disjoint paths from a given source to a given destination. The complexity of the procedures is $O(m \ln n + \Sigma n_i\, m_i \ln n_i)$, where m and n are the number of links and nodes (other than the source node) in the network, respectively. Further, $n_i$ and $m_i$ are the number of nodes in sub-tree i of the tree representing the shortest paths from the given source 0 to all destinations.

Procedures to Compute a Pair of Shortest Node-disjoint Paths

This procedure determines a pair of shortest node-disjoint paths from source 0 to all destinations.

```
shortest-node-disjoint-paths ( )
/* The directed graph with n+1 nodes and m links is stored as a collection of multi-
linked lists corresponding to the sparse adjacency matrix. The relevant pointers are
col-list[k] and row-list[k], k = 0, 1, . . . , n. The list node fields are (from, to, cost, rlink,
dlink). */
/* Initialize sets S, V.*/
S = {0};
V = {1, 2, . . ., n};
/* The set, V, is the set of nodes for which shortest paths have not been found. V is
stored as an AVL binary-search tree. The operation, V-{w} takes O(ln k) time, where
k = |V|. */
/* Initialize vector D1[.], heap H1 before running procedure */
/* D1[w] = (dist, prev, st) is a record of current shortest path from source 0 to node w,
w = 0, 1, . . ., n. 'dist' is shortest distance, 'prev' is previous-node, and 'st' is sub-
tree.*/
D1[0] = (0, 0, 0);
for I = 1, 2, . . ., n do {D1[I] = (∞, '-', '-')};
/* Heap H1 stores node IDs I, while the info is in array D1[I]. */
initialize-heap(H1);
/* Process links from source 0 to its neighbors. */
ptr = row-list[0];
while (ptr ◇ nil) {
    w = ptr↑.to;
    D1[w] = (ptr↑.cost, 0, '-');
    Add-to-heap(H1, w);
    ptr = ptr↑.rlink
    };
next-st = 1;                    /* To identify resulting sub-trees */
for count j = 1 to n do {
    delete-min-from-heap(H1, w);
    S = S + {w};
    V = V - {w};
    /* Assign an appropriate value for sub-tree. */
    if (D1[w].prev == 0) {
        D1[w].st = next-st;
        next-st = next-st + 1
        }
    else {
        v = D1[w].prev;
        D1[w].st = D1[v].st
        };
    /* Update D1[.] of all nodes in V to which there is a link from w. */
    ptr = row-list[w];
    while (ptr ◇ nil) {    /* process links from w to other nodes */
        v = ptr↑.to;
        if((v ∈ V ) && (D1[w].dist + ptr↑.cost < D1[v].dist)) {
            D1[v].dist = D1[w].dist +ptr↑.cost;
            D1[v].prev = w;
            add-or-adjust-heap(H1, v)
            };
        ptr = ptr↑.rlink
        }
    }                           /* This completes the step. */
no-of-st = next-st -1;          /* Number of sub-trees. */
/* ID "next-hop" from source 0 to each dest on shortest path; build routing table. */
next-hop1[0] = 0;
for I = 1, . . ., n do {
    v = I;
    while (D1[v].prev ◇ 0) {
```

-continued

```
            v = v↑.prev;
        };
    Next-hop1[I] = v
    }
/* Compute the second shortest paths to nodes in each sub-tree, t. */
for t = 1, 2, . . ., no-of-st do {
    /* Config structs before computing 2ⁿᵈ shortest path to nodes in sub-tree, t. */
    S2 = {0};
    V2 = { };               /* Identify nodes in sub-tree t. */
    for (I = 1, 2, . . , n, such-that D1[I].st = t) {
        V2 = V2 + {I}
        };
    initialize-heap(H2);    /* heap H2 stores indices I to D2[I]. */
    for I = 1, 2, . . ., n do {
        D2[I] = (∞, '-', '-')
        }
    for I = 1, 2, . . ., n, such-that D1[I].st = t do {
        /* find best available path from 0 to I, via nodes outside sub-tree, t. */
        ptr = col-list[I];
        min = '∞';
        prior = '-';
        while (ptr ◊ nil) {
            v = ptr↑.from;
            if((D1[v].st ◊ t) && ((D1[v].dist + ptr↑.cost) < min)) {
                min = D1[v].dist + ptr↑.cost;
                prior = v
                };
            ptr = ptr↑.dlink
            };
        *D2[I] = (min, prior, t);
        add-to-heap(H2, I);
        }
    /* Computation of 2ⁿᵈ shortest path now begin for each node in sub-tree t. */
    /* Make temporary copies of all data structures. */
    for I = 1, 2, . . ., n, do {
        temp-D2[I] = (∞, '-', '-');
        }
    for each node I ∈ V2 {
        copy-set(V2, temp-V2);
        copy-set(S2, temp-S2);
        copy-heap(H2, temp-H2);
        for each node I ∈ V2 do {
            temp-D2[I] = D2[I];
            }
        /* Delete nodes along shortest path from source to node I. */
        v = D1[I].prev;
        while(v ◊ 0) {
            temp-V2 = temp-V2 − {v};
            remove-from-heap(temp-H2, v};
            v = D1[v].prev
            }
        /* Run procedure on nodes in temp-V2. */
        while (temp-V2 ◊ empty) {
            delete-min-from-heap(temp-H2, w);
            temp-S2 = temp-S2 + {w};
            temp-V2 = temp-V2 − {w};
            /* Update temp-D2[.] of nodes to which there's a link from w*/
            ptr = temp-row-list[w];
            while (ptr ◊ nil) {    /* process links from w to other nodes */
                v = ptr↑.to;
                if ((v ∈ temp-V2) &&
                    (temp-D2[w].dist + ptr↑.cost < temp-D2[v].dist)) {
                    temp-D2[v].dist = temp-D2[w].dist + ptr↑.cost;
                    temp-D2[v].prev = w;
                    adjust-heap(temp-H2, v)
                    };
                ptr = ptr↑.rlink
                }
            }
        /* Identify "next-hop" from source to node I on 2ⁿᵈ shortest path. */
        v = I;
        while (temp-D2[v].st == t) {
            v = temp-D2[v].prev
            }
        u = temp-D2[v].prev;
        if (u == 0) {
            Next-hop2[I] = v
            }
        else {
```

```
            Next-hop2[I] = Next-hop1[u]
            }
        }
    }
}
END                     /* "shortest-node-disjoint-paths" */
```

Procedures to Compute a Pair of Shortest Link-disjoint Paths

This procedure determines a pair of shortest link-disjoint paths from source 0 to all destinations.

```
link-disjoint-paths ( )
/* Initialize sets S, V. */
S = {0};
V = {1, 2 . . ., n};
/* The set, V, is the set of nodes for which shortest path have not been found. V is
stored as an AVL binary-search tree. The operation, V-{w} takes O(ln k) time, where
k = |V|. */
D1[0] = (0, 0, 0);
/* D1[w] = (dist, prev, st) is a record of current shortest path from 0 to node w. 'dist'
is shortest distance, 'prev' is previous-node, and 'st' is sub-tree.*/
/* Initialize heap H1 and D1[.]*/
/* Heap H1 stores node IDs I, while the info is in array D1[I]. */
initialize-heap(H1);
for I = 1, 2, . . ., n do {
    D1[I] = (∞, '-', '-')
    };
/* Process links from source 0 to its neighbors. */
ptr = row-list[0];
while (ptr ◇ nil) {
    w = ptr↑.to;
    D1[w] = (ptr↑.cost, 0, '-');
    Add-to-heap(H1, w);
    ptr = ptr↑.dlink
next-st = 1;               /* To identify resulting sub-trees */
for countj = 1 to n do
    {delete-min-from-heap(H1, w);
    S =S + {w}; V =V - {w};
    if D1[w].prev = 0 {          /* assign a new sub-tree */
        D1[w].st = next-st; next-st = next-st + 1
        }
    else
        {v = D1[w].prev; D1[w].st = D1[v].st       /* record its sub-tree */
        }
    /* Update D1[.] of all nodes in V to which there is a link from w. */
    ptr = row-list[w];
    while (ptr ◇ nil) {          /* process links from w to other nodes */
        v = ptr↑.to;
        if((v ∈ V ) && (D1[w].dist + ptr↑.cost < D1[v].dist)) {
            D1[v].dist = D1[w].dist + ptr↑.cost;
            D1[v].prev = w;
            add-or-adjust-heap(H1, v)
            };
        ptr = ptr↑.rlink
        }
    }
/* ID "next-hop" from source 0 to each dest on shortest path; build routing table. */
next-hop1[0] = 0;
for I = 1, . . ., n do {
    v = I;
    while (D1[v].prev ◇ 0) {
        v = v↑.prev
        };
    Next-hop1[I] = v
    }
no-of-st = next-st –1;        /* No. of sub-trees. */
/* Compute the second shortest paths to nodes in each sub-tree, t. */
for t = 1, 2, . . ., no-of-st do
    {
    /* Config req structs before computing 2nd shortest path to sub-tree nodes */
    S2 = {0};
    V2 = { };           /* ID nodes in sub-tree t. */
```

```
        for I = 1, 2, . . ., n, such-that D1[I].st = t, do {
            V2 = V2 + {I}
        };
    initialize-heap(H2);     /* heap H2 stores indices I to D2[I]. */
    for I = 1, 2, . . ., n, do D2[I] = (∞, '-', '-');
    for I = 1, 2, . . ., n, such-that D1[I].st = t, do {
        /* find best available path from 0 to I, via nodes outside sub-tree, t. */
        ptr = col-list[I];
        min = '∞';
        prior = '-';
        while (ptr ◊ nil) {
            v = ptr↑.from;
            if((D1[v].st ◊ t) && (D1[v].dist + ptr↑.cost < min)) {
                min = D1[v].dist + ptr↑.cost;
                prior = v
            };
            ptr = ptr↑.dlink
        };
        D2[I] = (min, prior, t);
        add-to-heap(H2, I);
    }
    /* Computation of 2ⁿᵈ shortest path now begin for each node in sub-tree t.*/
    /* Make temporary copies of all data structures. */
    for I = 1, 2, . . ., n, do temp-D2[I] = (∞, '-', '-');
    for each node I ϵ V2 do {
        copy-set(V2, temp-V2);
        copy-set(S2, temp-S2);
        copy-heap(H2, temp-H2);
        for each node I ϵ V2 do temp-D2[I] = D2[I];
        /* Identify links from source to node I, and form the set, exclude. The
        set, exclude, is stored as an AVL search tree.*/
        v = I;
        exclude <-- { };
        while (v ◊ 0) {
            w = D1[v].prev;
            exclude <-- exclude + {(w,v)};
            v = w
        };
        /* Run procedure on nodes in temp-V2. */
        while (temp-V2 ◊ empty) {
            delete-min-from-heap(temp-H2, w);
            temp-S2 =temp-S2 + {w};
            temp-V2 =temp-V2 - {w};
            /* Update temp-D2[.] of nodes to which there is a link from w*/
            ptr = row-list[w];
            while (ptr ◊ nil) {    /* process links from w to other nodes */
                v = ptr↑.to;
                if ((v ϵ temp-V2) && (w,v) ∉ exclude
                && (temp-D2[w].dist + ptr↑.cost < temp-D2[v].dist)) {
                    temp-D2[v].dist = temp-D2[w].dist + ptr↑.cost;
                    temp-D2[v].prev = w;
                    adjust-heap(temp-H2, v)
                };
                ptr = ptr↑.rlink
            }
        }
        /* Identify "next-hop" from source to node I on 2ⁿᵈ shortest path. */
        v = I;
        while (temp-D2[v].st = t do {
            v = temp-D2[v].prev
        };
        u = temp-D2[v].prev;
        if(u = 0) {
            Next-hop2[I] = v
        }
        else {
            Next-hop2[I] = Next-hop1[u]
        }
    }
}
}
END                 /* End of "link-disjoint-paths" */
```

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method of operating a fault tolerant connection in a network, wherein said network comprises a plurality of network elements and each one of said network elements is coupled to at least one other of said network elements by at least one of a plurality of links, comprising:
   identifying a first path, wherein said first path is between a first one of said network elements and a second one of said network elements;
   identifying a second path, wherein
      said second path is between said first one and said second one of said network elements, and
      said first path and said second path are disjoint;
   sending a packet from said first one of said network elements via said first path using a label-switching protocol;
   sending a duplicate packet from said first one of said network elements via said second path using the label-switching protocol, wherein said duplicate packet is a duplicate of said packet,
   receiving at least one of said packet and said duplicate packet at said second one of said network elements; and
   discarding one of said packet and said duplicate packet, if both said packet and said duplicate packet are received at said second one of said network elements,
   wherein said first path and said second path are node-disjoint,
   wherein said identifying said first path and said identifying said second path comprise:
      storing cost and topology information representing said network in a sparse matrix;
      storing identifiers in a heap data structure, wherein each one of said identifiers represents a corresponding one of said network elements;
      identifying ones of said network elements in said first path using identifiers stored in said heap data structure;
      removing ones of said identifiers corresponding to said ones of said network elements in said first path from said heap data structure; and
      identifying ones of said network elements in said second path using identifiers still stored in said heap data structure.

2. The method of claim 1, wherein said sparse matrix is stored in an AVL binary search tree.

3. The method of claim 1, wherein said first path is a shortest node-disjoint path and said second path is a second-shortest node-disjoint path.

4. The method of claim 3, wherein said identifying said ones of said network elements in said first path and said identifying said ones of said network elements in said second path are performed using an open shortest path first (OSPF) algorithm.

5. The method of claim 1, wherein said first path and said second path each include ones of said network elements and said links.

6. A method of operating a fault tolerant connection in a network, wherein said network comprises a plurality of network elements and each one of said network elements is coupled to at least one other of said network elements by at least one of a plurality of links, comprising:
   identifying a first path, wherein said first path is between a first one of said network elements and a second one of said network elements;
   identifying a second path, wherein
      said second path is between said first one and said second one of said network elements, and
      said first path and said second path are disjoint;
   sending a packet from said first one of said network elements via said first path using a label-switching protocol;
   sending a duplicate packet from said first one of said network elements via said second path using the label-switching protocol, wherein said duplicate packet is a duplicate of said packet,
   receiving at least one of said packet and said duplicate packet at said second one of said network elements; and
   discarding one of said packet and said duplicate packet, if both said packet and said duplicate packet are received at said second one of said network elements,
   wherein said first path and said second path are link disjoint,
   wherein said identifying said first path and said identifying said second path comprise:
      storing cost and topology information representing said network in a sparse matrix;
      storing identifiers in a heap data structure, wherein each one of said identifiers represents a corresponding one of said links;
      identifying ones of said links in said first path using identifiers stored in said heap data structure;
      removing ones of said identifiers corresponding to said ones of said links in said first path from said heap data structure; and
      identifying ones of said network elements in said second path using identifiers still stored in said heap data structure.

7. The method of claim 6, wherein said first path and said second path are node-disjoint.

8. The method of claim 6, wherein said first path is a shortest link-disjoint path and said second path is a second-shortest link-disjoint path.

9. The method of claim 8, wherein said identifying said ones of said network elements in said first path and said identifying said ones of said network elements in said second path are performed using an open shortest path first (OSPF) algorithm.

10. The method of claim 6, wherein said sparse matrix is stored in an AVL binary search tree.

11. A computer system comprising:
   a processor;
   a network interface, coupled to said processor and to a network, wherein said network comprises a plurality of network elements and each one of said network elements is coupled to at least one other of said network elements by at least one of a plurality of links;
   computer readable medium coupled to said processor; and
   computer code, encoded in said computer readable medium, configured to cause said processor to:
      identify a first path, wherein said first path is between a first one of said network elements and a second one of said network elements;

identify a second path, wherein
said second path is between said first one and said second one of said network elements, and
said first path and said second path are disjoint;
send a packet from said first one of said network elements via said first path using a label-switching protocol; and
send a duplicate packet from said first one of said network elements via said second path using the label-switching protocol, wherein said duplicate packet is a duplicate of said packet,
wherein said second one of said network elements is configured to receive at least one of said packet and said duplicate packet,
wherein said second one of said network elements is further configured to discard one of said packet and said duplicate packet, if both said packet and said duplicate packet are received at said second one of said network elements,
wherein said first path and said second path are node-disjoint,
wherein said computer code configured to cause said processor to identify said first path and to identify said second path is further configured to cause said processor to:
store cost and topology information representing said network in a sparse matrix;
store identifiers in a heap data structure, wherein each one of said identifiers represents a corresponding one of said network elements;
identify ones of said network elements in said first path using identifiers stored in said heap data structure;
remove ones of said identifiers corresponding to said ones of said network elements in said first path from said heap data structure; and
identify ones of said network elements in said second path using identifiers still stored in said heap data structure.

12. The computer system of claim 11, wherein said sparse matrix is stored in an AVL binary search tree.

13. The computer system of claim 11, wherein said first path is a shortest node-disjoint path and said second path is a second-shortest node-disjoint path.

14. The computer system of claim 13, wherein said identifying said ones of said network elements in said first path and said identifying said ones of said network elements in said second path are performed using an open shortest path first (OSPF) algorithm.

15. The computer system of claim 11, wherein said first path and said second path each include ones of said network elements and said links.

16. The computer system of claim 11, wherein said first one of said network elements comprises said computer system.

17. A computer system comprising:
a processor,
a network interface, coupled to said processor and to a network, wherein said network comprises a plurality of network elements and each one of said network elements is coupled to at least one other of said network elements by at least one of a plurality of links;
computer readable medium coupled to said processor; and
computer code, encoded in said computer readable medium, configured to cause said processor to:
identify a first path, wherein said first path is between a first one of said network elements and a second one of said network elements;
identify a second path, wherein
said second path is between said first one and said second one of said network elements, and
said first path and said second path are disjoint;
send a packet from said first one of said network elements via said first path using a label-switching protocol; and
send a duplicate packet from said first one of said network elements via said second path using the label-switching protocol, wherein said duplicate packet is a duplicate of said packet,
wherein said second one of said network elements is configured to receive at least one of said packet and said duplicate packet,
wherein said second one of said network elements is further configured to discard one of said packet and said duplicate packet, if both said packet and said duplicate packet are received at said second one of said network elements,
wherein said first path and said second path are link disjoint, wherein said computer code configured to cause said processor to identify said first path and to identify said second path is further configured to cause said processor to:
store cost and topology information representing said network in a sparse matrix;
store identifiers in a heap data structure, wherein each one of said identifiers represents a corresponding one of said links;
identify ones of said links in said first path using identifiers stored in said heap data structure;
remove ones of said identifiers corresponding to said ones of said links in said first path from said heap data structure; and
identify ones of said network elements in said second path using identifiers still stored in said heap data structure.

18. The computer system of claim 17, wherein said first path and said second path are node-disjoint.

19. The computer system of claim 17, wherein said sparse matrix is stored in an AVL binary search tree.

20. The computer system of claim 17, wherein said first path is a shortest link-disjoint path and said second path is a second-shortest link-disjoint path.

21. The computer system of claim 20, wherein said identifying said ones of said network elements in said first path and said identifying said ones of said network elements in said second path are performed using an open shortest path first (OSPF) algorithm.

22. A computer program product encoded in computer readable media, said computer program product comprising:
a first set of instructions, executable on a computer system, configured to identify a first path, wherein said first path is between a first one of said network elements and a second one of said network elements;
a second set of instructions, executable on said computer system, configured to identify a second path, wherein said second path is between said first one and said second one of said network elements, and
said first path and said second path are disjoint;
a third set of instructions, executable on said computer system, configured to send a packet from said first one of said network elements via said first path using a label-switching protocol; and
a fourth set of instructions, executable on said computer system, configured to send a duplicate packet from said first one of said network elements via said second path using a label-switching protocol, wherein said duplicate packet is a duplicate of said packet, wherein said second one of said network elements is configured to receive at least one of said packet and said duplicate packet, wherein said second one of said network elements is further configured to discard one of said packet and said duplicate packet, if both said packet and said duplicate packet are received at said second one of said network elements, wherein said first path and said second path are node-disjoint, wherein said first and said second sets of instructions each comprises:
- a first sub-set of instructions, executable on said computer system, configured to store cost and topology information representing said network in a sparse matrix;
- a second sub-set of instructions, executable on said computer system, configured to store identifiers in a heap data structure, wherein each one of said identifiers represents a corresponding one of said network elements;
- a third sub-set of instructions, executable on said computer system, configured to identify ones of said network elements in said first path using identifiers stored in said heap data structure;
- a fourth sub-set of instructions, executable on said computer system, configured to remove ones of said identifiers corresponding to said ones of said network elements in said first path from said heap data structure; and
- a fifth sub-set of instructions, executable on said computer system, configured to identify ones of said network elements in said second path using identifiers still stored in said heap data structure.

23. The computer program product of claim 22, wherein said sparse matrix is stored in an AVL binary search tree.

24. The computer program product of claim 22, wherein said first path is a shortest node-disjoint path and said second path is a second-shortest node-disjoint path.

25. The computer program product of claim 24, wherein said identifying said ones of said network elements in said first path and said identifying said ones of said network elements in said second path are performed using an open shortest path first (OSPF) algorithm.

26. A computer program product encoded in computer readable media, said computer program product comprising:
- a first set of instructions, executable on a computer system, configured to identify a first path, wherein said first path is between a first one of said network elements and a second one of said network elements;
- a second set of instructions, executable on said computer system, configured to identify a second path, wherein said second path is between said first one and said second one of said network elements, and said first path and said second path are disjoint;
- a third set of instructions, executable on said computer system, configured to send a packet from said first one of said network elements via said first path using a label-switching protocol; and
- a fourth set of instructions, executable on said computer system, configured to send a duplicate packet from said first one of said network elements via said second path using a label-switching protocol, wherein said duplicate packet is a duplicate of said packet, wherein said second one of said network elements is configured to receive at least one of said packet and said duplicate packet, wherein said second one of said network elements is further configured to discard one of said packet and said duplicate packet, if both said packet and said duplicate packet are received at said second one of said network elements, wherein said first path and said second path are link-disjoint, wherein said first and said second sets of instructions each comprises:
- a first sub-set of instructions, executable on said computer system, configured to store cost and topology information representing said network in a sparse matrix;
- a second sub-set of instructions, executable on said computer system, configured to store identifiers in a heap data structure, wherein each one of said identifiers represents a corresponding one of said links;
- a third sub-set of instructions, executable on said computer system, configured to identify ones of said links in said first path using identifiers stored in said heap data structure;
- a fourth sub-set of instructions, executable on said computer system, configured to remove ones of said identifiers corresponding to said ones of said links in said first path from said heap data structure; and
- a fifth sub-set of instructions, executable on said computer system, configured to identify ones of said network elements in said second path using identifiers still stored in said heap data structure.

27. The computer program product of claim 26, wherein said first path and said second path are node-disjoint.

28. The computer program product of claim 26, wherein said sparse matrix is stored in an AVL binary search tree.

29. The computer program product of claim 26, wherein said first path is a shortest link-disjoint path and said second path is a second-shortest link-disjoint path.

30. The computer program product of claim 29, wherein said identifying said ones of said network elements in said first path and said identifying said ones of said network elements in said second path are performed using an open shortest path first (OSPF) algorithm.

31. The computer program product of claim 26, wherein said first path and said second path each include ones of said network elements and said links.

32. The computer program product of claim 26, wherein said first one of said network elements comprises said computer system.

33. An apparatus for providing a fault tolerant connection in a network, wherein said network comprises a plurality of network elements and each one of said network elements is coupled to at least one other of said network elements by at least one of a plurality of links, comprising:
- means for identifying a first path, wherein said first path is between a first one of said network elements and a second one of said network elements;
- means for identifying a second path, wherein
  said second path is between said first one and said second one of said network elements, and
  said first path and said second path are disjoint;
- means for sending a packet from said first one of said network elements via said first path using a label-switching protocol;
- means for sending a duplicate packet from said first one of said network elements via said second path using the label-switching protocol, wherein said duplicate packet is a duplicate of said packet;

means for receiving at least one of said packet and said duplicate packet at said second one of said network elements; and means for discarding one of said packet and said duplicate packet, if both said packet and said duplicate packet are received at said second one of said network elements wherein said first path and said second path are node-disjoint, wherein said means for identifying said first path and said means for identifying said second path comprise:
  means for storing cost and topology information representing said network in a sparse matrix;
  means for storing identifiers in a heap data structure, wherein each one of said identifiers represents a corresponding one of said network elements;
  means for identifying ones of said network elements in said first path using identifiers stored in said heap data structure;
  means for removing ones of said identifiers corresponding to said ones of said network elements in said first path from said heap data structure; and
  means for identifying ones of said network elements in said second path using identifiers still stored in said heap data structure.

34. The apparatus of claim 33, wherein said sparse matrix is stored in an AVL binary search tree.

35. The apparatus of claim 33, wherein said first path is a shortest node-disjoint path and said second path is a second-shortest node-disjoint path.

36. The apparatus of claim 35, wherein said means for identifying said ones of said network elements in said first path and said means for identifying said ones of said network elements in said second path employ an open shortest path first (OSPF) algorithm.

37. An apparatus for providing a fault tolerant connection in a network, wherein said network comprises a plurality of network elements and each one of said network elements is coupled to at least one other of said network elements by at least one of a plurality of links, comprising:
  means for identifying a first path, wherein said first path is between a first one of said network elements and a second one of said network elements;
  means for identifying a second path, wherein
    said second path is between said first one and said second one of said network elements, and
    said first path and said second path are disjoint;

means for sending a packet from said first one of said network elements via said first path using a label-switching protocol;
  means for sending a duplicate packet from said first one of said network elements via said second path using the label-switching protocol, wherein said duplicate packet is a duplicate of said packet;
  means for receiving at least one of said packet and said duplicate packet at said second one of said network elements; and
  means for discarding one of said packet and said duplicate packet, if both said packet and said duplicate packet are received at said second one of said network elements wherein said first path and said second path are link-disjoint, wherein said means for identifying said first path and said means for identifying said second path comprise:
  means for storing cost and topology information representing said network in a sparse matrix;
  means for storing identifiers in a heap data structure, wherein each one of said identifiers represents a corresponding one of said links;
  means for identifying ones of said links in said first path using identifiers stored in said heap data structure;
  means for removing ones of said identifiers corresponding to said ones of said links in said first path from said heap data structure; and
  means for identifying ones of said network elements in said second path using identifiers still stored in said heap data structure.

38. The apparatus of claim 37, wherein said sparse matrix is stored in an AVL binary search tree.

39. The apparatus of claim 37, wherein said first path is a shortest link-disjoint path and said second path is a second-shortest link-disjoint path.

40. The apparatus of claim 39, wherein said means for identifying said ones of said network elements in said first path and said means for identifying said ones of said network elements in said second path employ an open shortest path first (OSPF) algorithm.

41. The apparatus of claim 39, wherein said first path and said second path each include ones of said network elements and said links.

42. The apparatus of claim 37, wherein said first path and said second path are node-disjoint.

\* \* \* \* \*